No. 2,882. REISSUED FEB. 25, 1868.
L. BAILEY & R. THAYER.
LAMP.
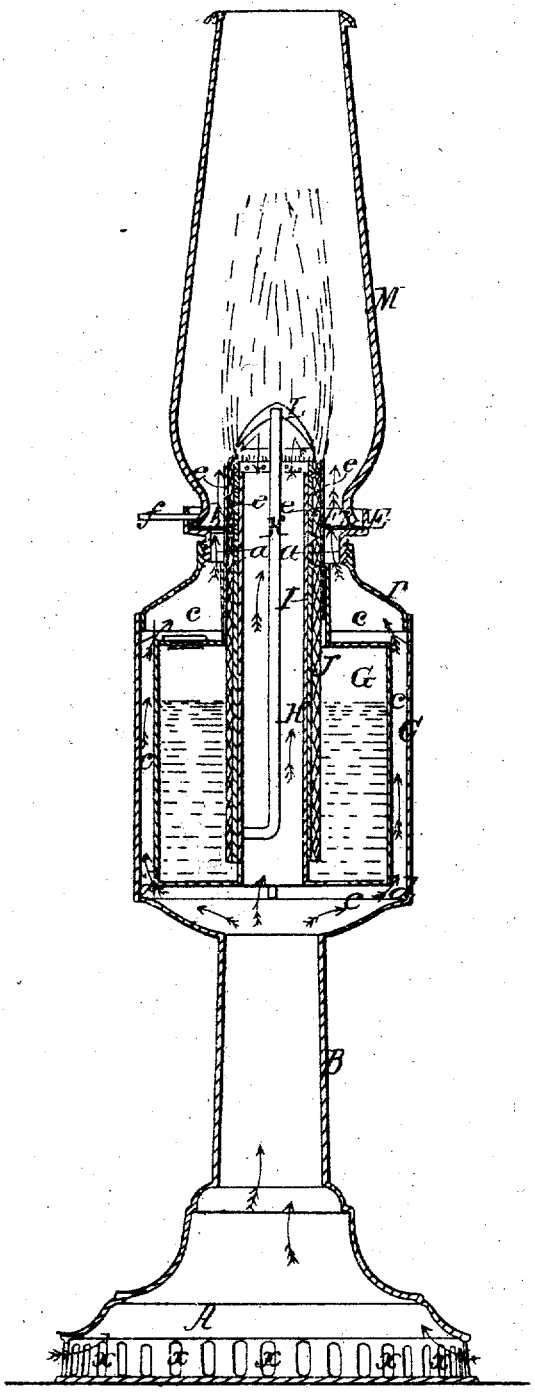

United States Patent Office.

WILLIAM N. ELY, OF STRATFORD, CONNECTICUT, ASSIGNEE BY MESNE ASSIGNMENTS OF L. BAILEY AND R. THAYER.

*Letters Patent No.* 20,134, *dated May* 4, 1858; *reissue No.* 2,882, *dated February* 25, 1868.

IMPROVEMENT IN LAMPS.

The Schedule referred to in these Letters Patent and making part of the same.

TO WHOM IT MAY CONCERN:

Be it known that L. BAILEY, of Charlestown, and R. THAYER, of Boston, in the State of Massachusetts, invented a new and improved Lamp for burning hydrocarbons requiring a large amount of oxygen; and the following, with the drawing, is a full and exact description of the same, the drawing being a vertical section of the lamp.

The invention consists mainly in a peculiar construction of the lamp, whereby the flame is supplied with a large amount of oxygen, and the light readily graduated and extinguished, and the wick easily managed, while the reservoir is kept in a comparatively cool state.

A represents the base of the lamp. B is the pedestal, supporting a cylindrical or other shaped case, C, having a deflecting top or cover, D, forming part of the case or applied to it. The base, A, and pedestal B are hollow, and the sides of the base are perforated, as at *x x*, for the admission of air. The interior of the base, A, pedestal B, and case C communicate. The upper part of the case is provided with a cover, D, in the centre of which a cap, E, is screwed. This cap has a vertical tube, F, secured in it at its centre, and projecting above and below the cap, allowing a space, *a*, between the tube and cap, which is covered with wire gauze or a perforated plate, *b*. G is a reservoir fitted within the case C, and is sufficiently smaller than C to allow a free air-passage, *c c*, all around it. Exterior flanches, *d*, are attached to the reservoir or lamp-body, to keep it in proper position in the case. The reservoir or lamp-body is of annular form, so as to allow a central passage, H, entirely through it, although this may not be necessary in all cases. The inner side of this reservoir extending up some distance, forms a tube, around which the wick-tube I is fitted. This wick-tube passes through an annular opening into the lamp-body, and a tubular wick, J, is used. The upper end of this tube is corrugated to retain the wick. Within the tube H a rod, K, is secured, which projects a short distance above the wick-tube, and a concavo-convex button, L, about equal in diameter to the wick-tube, is fitted thereon. M is a chimney, resting on the cap E, and retained by a spring-catch, *f*. The rod K may be made to project downwards as desired, in any suitable manner, extending from the flame to the pedestal. This rod becoming heated, will aid in producing an accelerated current or rush of air from without into and up through the base, pedestal, and case to the flame. When the wick is lighted the air passes into and up through the base, A, pedestal B, and case C, around the lamp-body G, in the space *c c*, to the flame. It also passes through the passage H to the flame. The button L, when used, throws the central current of air directly down on the flame, (see arrows.) The outer current of air is deflected towards the flame by means of the plate or cover D. The flame may be regulated by raising or lowering the tube F by screwing up or down the cap E in the cover D.

The flame is thus supplied with a large amount of oxygen, flickering is prevented by the method of feeding in the air, and a steady light is obtained.

Other openings into the pedestal or the lower portion of the case may be made without altering the general idea, but the arrangement shown has been preferred. The reservoir is kept comparatively cool, being surrounded by a current of air, and also having a current up through its centre.

*Claims*

1. Suspending the body of the lamp within an outer case, so arranged that the air shall pass within the case and around the lamp-body to the flame, substantially as described.
2. A hollow lamp-case, pedestal, and base, constructed and arranged in relation to the lamp-body, substantially as described.
3. An annular lamp-body, in combination with an outer case, substantially as described.
4. Constructing and arranging the parts so as to deflect the air coming up from outside the lamp-body towards the flame, substantially as described.
5. Supplying air to the flame by means of the channel formed between the body of the lamp and the outside shell or case, substantially as described.
6. Arranging and using the rod or wire K in relation to the flame and hollow pedestal and outer case, substantially as and for the purposes described.
7. The concavo-convex button, constructed and arranged substantially as and for the purpose described.

WILLIAM N. ELY.

Witnesses:

W. M. PARKER,

EDMUND DURGIN.